(12) United States Patent
Alberth, Jr. et al.

(10) Patent No.: US 7,209,742 B2
(45) Date of Patent: Apr. 24, 2007

(54) WIRELESS MOBILE STATION LOSS PREVENTION IN MULTI-NETWORK COMMUNICATION SYSTEMS

(75) Inventors: William P. Alberth, Jr., Crystal Lake, IL (US); Brian D. Storm, Round Lake Beach, IL (US); William E. Welnick, Poway, CA (US); David J. Krause, Hainesville, IL (US)

(73) Assignee: Motorola, Inc., Schaumburg, IL (US)

( * ) Notice: Subject to any disclaimer, the term of this patent is extended or adjusted under 35 U.S.C. 154(b) by 669 days.

(21) Appl. No.: 10/417,518

(22) Filed: Apr. 17, 2003

(65) Prior Publication Data

US 2004/0209593 A1 Oct. 21, 2004

(51) Int. Cl.
*H04Q 7/20* (2006.01)
*H04B 1/38* (2006.01)
*H04M 1/00* (2006.01)

(52) U.S. Cl. .................. 455/435.2; 455/552.1
(58) Field of Classification Search .. 455/435.1–435.3, 455/552.1, 515, 403
See application file for complete search history.

(56) References Cited

U.S. PATENT DOCUMENTS 5,870,615 A 2/1999 Bar-On et al.
6,463,298 B1 * 10/2002 Sorenson et al. ........ 455/552.1
6,546,253 B1 * 4/2003 Chow et al. .............. 455/439
2002/0187804 A1 * 12/2002 Narasimha et al. ........ 455/552
2004/0192304 A1 * 9/2004 Casaccia et al. ......... 455/435.1

FOREIGN PATENT DOCUMENTS

EP 1 134 958 9/2001
GB 2 296 157 6/1996

OTHER PUBLICATIONS

European Search Report dated Dec. 16, 2003 issued in a counterpart application, namely, Appln. No. 03010423.6.

* cited by examiner

*Primary Examiner*—Benny Q. Tieu
(74) *Attorney, Agent, or Firm*—Roland K. Bowler, II

(57) ABSTRACT

Methods in communications devices and networks for reducing an infrastructure registration race condition. In one embodiment, a communications device transmits (310) a first network connection request is a first network, and after waiting a specified time interval, the communication device transmits (320) another network connection request to the first network. The communications device may determine the time interval, or it may be received (302) from the network. Alternatively, a time stamp or some other indicium is applied to the connection requests transmitted by the communications device so that a home location register or other entity may determine the order in which the requests were transmitted.

12 Claims, 4 Drawing Sheets

WIRELESS MOBILE STATION LOSS PREVENTION IN MULTI-NETWORK COMMUNICATION SYSTEMS

FIELD OF THE DISCLOSURE

The present disclosure relates generally to wireless communications, and more particularly to preventing lost mobile states in multi-network communications systems, for example, when registering in digital CDMA and AMPS analog networks, and methods therefor.

BACKGROUND OF THE DISCLOSURE

Mobile cellular telephones, or mobile stations, are occasionally unable to receive incoming calls because the cellular telephone is camped on a channel or communicating in a network that is different than the network indicated in the registration at the Home Location Register (HLR). The discrepancy results in transmitting pages for the mobile station to the wrong channel or network. A mobile station in this state is sometimes referred to as a "Lost Mobile".

One such circumstance that may result in the Lost Mobile state is a multi-infrastructure registration race. This circumstance is known to occur when a mobile station, initially registered on a CDMA cellular network, registers on an AMPS cellular network and then returns to the CDMA network in a relatively short time period. The mobile station may register with the AMPS network, for example, upon losing the CDMA paging channel. An analog switch in the AMPS network generally provides the mobile station with an acknowledgement (ACK) before the switch communicates the registration to the HLR. In some instances, when the mobile station returns to and registers with the CDMA network, the CDMA controller switch will communicate the registration on the CDMA network to the HLR before the HLR receives the prior registration from the AMPS switch. Under these circumstances, the mobile station will be camped on the CDMA network, but the HLR will indicate that the mobile station is in the AMPS network, since the HLR receives the AMPS registration after receipt of the CDMA registration. Incoming pages will thus be sent to the wrong network. The delay in the communication of the registration from the AMPS switch to the HLR may be attributed, among other causes, to efforts to reduce network traffic in the AMPS network by accumulating multiple registrations before communicating with the HLR within a timeout period, the expiration of which generally prompts transmission of the registration to the HLR with or without other registrations.

The Lost Mobile state may also result from the failure of a mobile station to receive an acknowledgement upon registering in an AMPS analog network, for example, due to poor coverage, after having been registered in a CDMA network. If the mobile station subsequently returns, from the AMPS network, back to the CDMA network to which it was last successfully registered, the mobile station will not re-register with the CDMA network, since the mobile station will not have been informed of the intervening registration on the AMPS network for its failure to receive the AMPS registration acknowledgement. Under these circumstances, the mobile station will be camped on the CDMA network, while the HLR indicates that the mobile station is in the AMPS network. Incoming pages for the mobile station will again be sent to the wrong network.

A mobile station will generally remain in the Lost Mobile state until any one of several actions occurs, including, among others, the origination of an outgoing communication by the mobile station, re-registration of the mobile station on another system, for example, in response to loss of the paging channel, power-cycling of the mobile station, and/or until the occurrence of a timer-based registration event, which may not occur for 10s of minutes in some networks.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
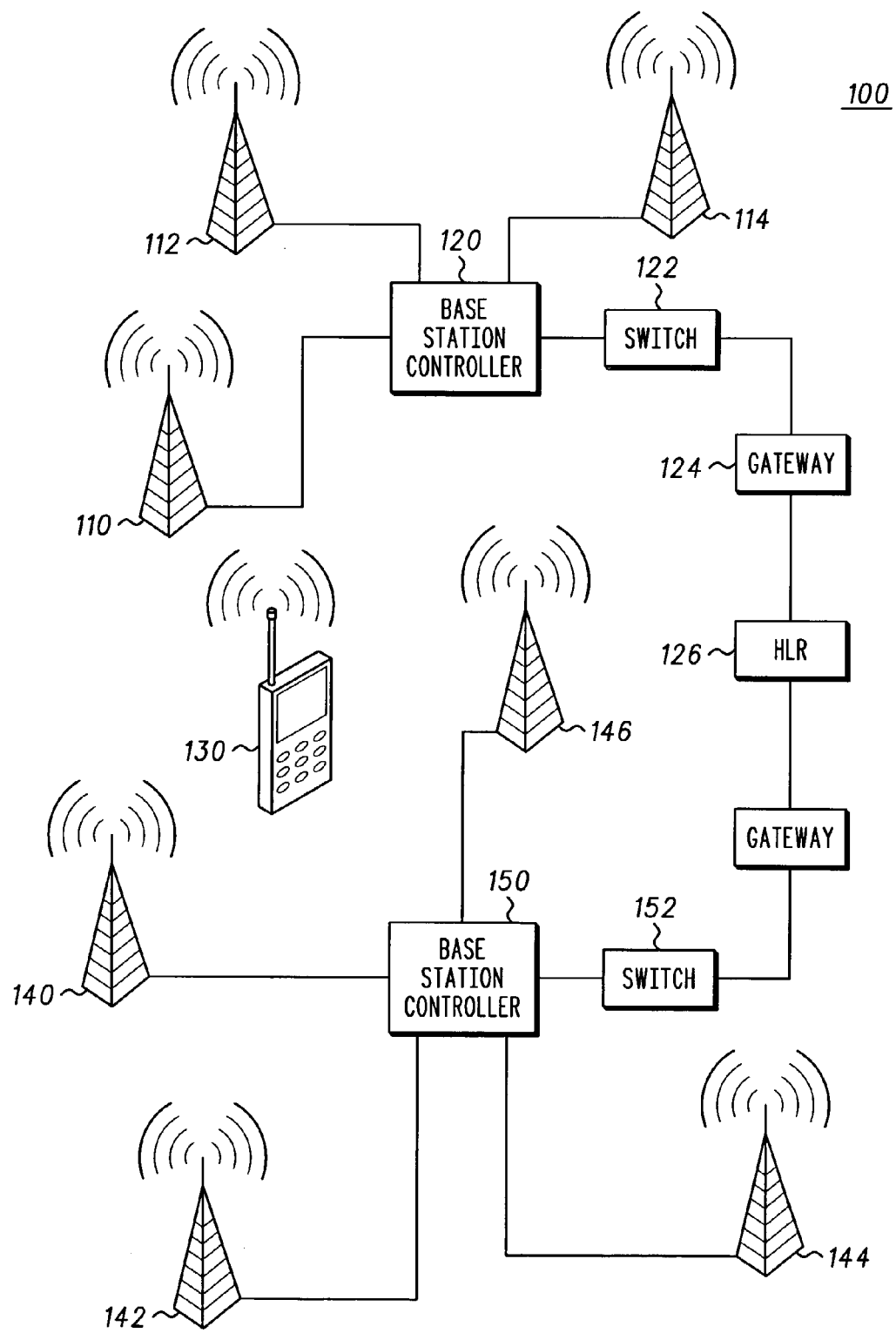
FIG. 1 is an exemplary multi-network.

FIG. 1 is an exemplary multi-network 100 comprising generally a first network including a plurality of transceivers 110, 112, 114, etc. communicably coupled to a base station controller 120, which is coupled to well known inter-network infrastructure and to other communications networks. The exemplary multi-network also comprises a second network including a plurality of transceivers 140, 142, 144, 146, etc. communicably coupled to a base station controller 150, which is also connected to infrastructure of the second network and to the first network and to other networks. In other embodiments, one or both of the networks may be configured differently, though each network generally includes at least one transceiver and/or a controller for communicating within and outside the network, for example, to packet data or circuit switched networks, etc.

The first and second networks of the multi-network in FIG. 1 may be of any type. In one embodiment, the first network is a CDMA communications network and the second network is an AMPS analog communications network. In another embodiment, the first and second networks are of the same type, for example, networks of competing carriers or service providers. In another embodiment, one network is a cellular communications network, for example a GSM/GPRS network and/or a CDMA or W-CDMA network, and the other network is a Bluetooth network or an IEEE 802.11b network, or some other local area or ad hoc network. In yet another embodiment, one network is a wired network such as USB (Universal Serial Bus), Firewire, DSL, cable modem, or any other local or wide area wired network.

The first and second networks generally include a switch communicably coupled to, among other places, one or more locations associated with communications devices in the network, for example, with mobile wireless communications device 130 in FIG. 1. In the exemplary multi-network of FIG. 1, for example, the base controller 120 includes or is coupled to a switch 122 communicably coupled, for example, via gateway 124, to a home location register (HLR) 126, which is a repository for storing registration information pertaining to wireless communications devices. Some networks include one or more mirror home location registers. In the exemplary embodiment, the controller 150 also includes or is coupled to a switch 152 that communicates with the home location register (HLR) 126. Other networks may include other means for communicating with the home location register or with one or more similar entities for storing and updating network registration information for communications devices that communicate on different networks.

Figure 2:
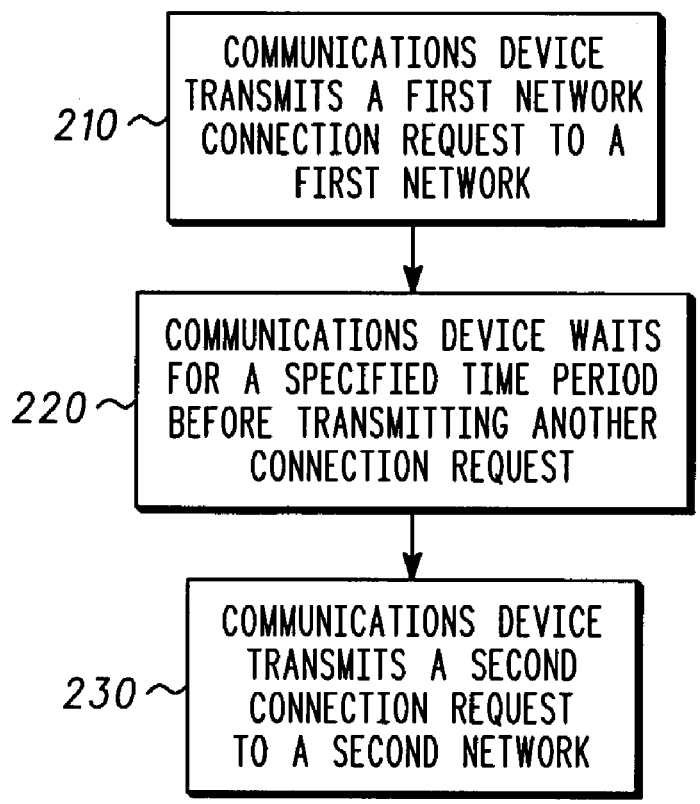
FIG. 2 is a first exemplary process flow diagram for connecting a communications device to a network.

In the process diagram 200 of FIG. 2, at block 210, a communications device transmits a first network connection request to a first network. In some embodiments, for example, the connection request is a registration request sent to the network upon powering-up the device or upon entering a new network or upon losing a paging channel in another network, etc. At block 220, the communications device waits for a specified time period to elapse before sending another network connection request. In some embodiments the communications device specifies the time period referenced at block 220, and in other embodiments a network specifies the time period. At block 230, the communications device transmits a second network connection request to a second network upon expiration of, or after waiting for, the specified time period, which is for example several seconds. The second network connection request may be sent for any reason. For example, the communications device may have newly acquired the second network, or it may have dropped a prior network connection, or it may not have received an acknowledgement in response to a prior connection request. Delaying transmission of the second connection request to the second network provides time for the first network to communicate the first network connection request to the HLR of the communications device, thereby reducing the likelihood that the first connection request is communicated to the HLR after the second connection request, i.e., an infrastructure race condition. The specified delay is preferably based upon known delay in the communication of the registration request from the first network to the HLR. The known delay may be based upon empirical evidence obtained for a particular network.

According to another embodiment, the infrastructure race condition is addressed by sending multiple connection requests to the same network after a specified time period, thereby ensuring that any connection request sent previously to another network is not the last connection request logged at the home location register. Particularly, in process 300 of FIG. 3, at block 310, a communications device sends a first network connection request to a first network. At block 320, the communications device waits for a specified time period to elapse before sending another connection request to the same network. At block 330, after the time period has elapsed, the communications device transmits a second network connection request to the same network. Transmitting multiple network connection requests to the same network ensures that any prior network connection requests sent to other networks will not be the most recent connection registration recorded at the HLR of the communication device.

In one embodiment, the communications device transmits the second connection request, at block 330, only if a network connection request was transmitted to another network within some specified time period prior to the transmission of the first connection request at block 310. The specified time period may be a few seconds, though more generally it is dependent upon the delay inherent in the other network to which the prior connection request was sent. The transmission of the second network connection request ensures that the HLR reflects registration at the correct network.

Figure 3:
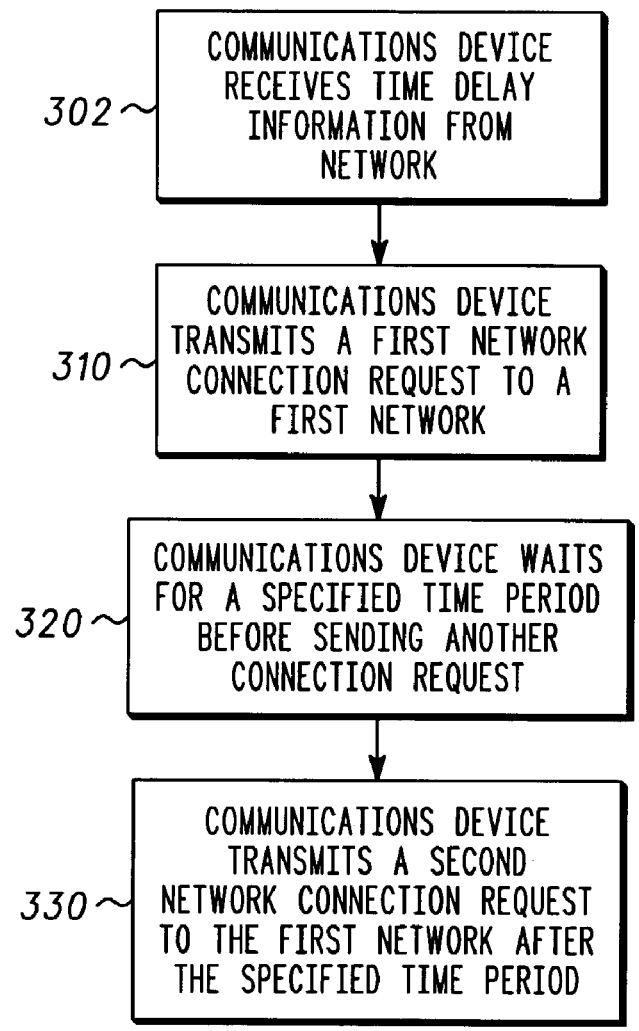
FIG. 3 is another exemplary process flow diagram for connecting a communications device to a network.

In one embodiment, the network to which the first connection request is sent, at block 310, provides time delay information to the communications device, for example, in a network message, preferably before the communications device transmits the first connection request at block 310. The delay information provided by the network may be the specified time delay or period or it may be information from which the specified time period may be obtained or based. Thus upon entering the first network, the communications device receives a message, for example, a broadcast message, that specifies how long the communications device should delay before re-transmitting the network connection request to the network. In FIG. 3, at block 302, the communications device receives time delay information from the first network.

In one embodiment, first the network provides time delay information for multiple neighboring networks to which the communications device may have sent prior connection request. The time delay information is preferably based upon known delays associated with the transmission of registration information from each of the corresponding neighboring networks to the HLR. According to this aspect of the disclosure, the time delay used by the communication device depends upon the network to which the communication device attempted to connect most recently before connecting to the first network at block 310 in FIG. 3.

Figure 4:
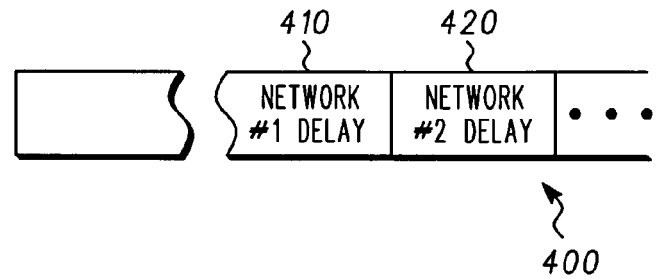
FIG. 4 is an exemplary network message having connection request delay time information.

FIG. 4 is an exemplary message 400, for example, a portion of a network broadcast message, including multiple fields 410, 420 . . . for indicating how much delay is associated with the communication of network connection registration information by a particular network to a home location register or a similar entity. In one embodiment, some bits in the same or a different field are designated for identifying the network and other bits are designated for identifying the delay associated with the network. Alternatively, it may be desirable for the network to specify a single delay period that is sufficient to accommodate the delay associated with all relevant networks.

Figure 5:
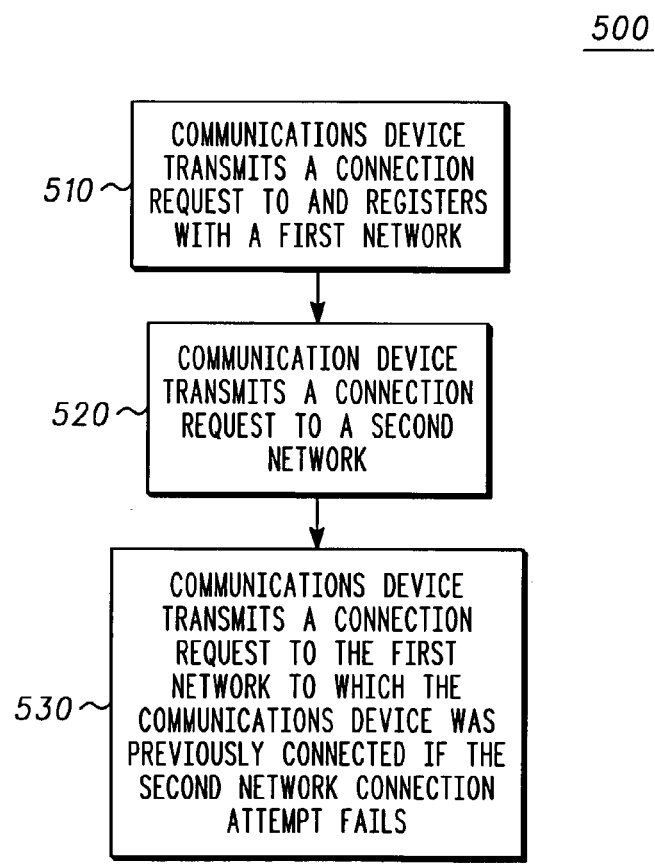
FIG. 5 is another exemplary process flow diagram for connecting a communications device to a network.

According to another aspect of the disclosure illustrated in the process diagram 500 of FIG. 5, at block 510, the communications device transmits a network connection request to a first network and is registered on the first network. At block 520, the communications device transmits a network connection request to a second network, for example, upon losing the paging channel of the first network to which the device was previously connected. At block 530, if the communications device detects the first network, the communications device transmits a network communication request to the first network if the attempt to connect to the second network fails, for example, if the communications device does not receive a network connection acknowledgement within a specified time period in response to the second network connection request.

According to yet another aspect of the disclosure, network connection requests are tagged with an indicium indicating the order in which the network requests are transmitted, regardless of the order in which the connection requests are communicated to the home location register. In one embodiment, the communications device applies the indicium to the network connection requests, for example, at the time of transmission. In another embodiment, the network applies an indicium to the network connection requests, preferably as soon as possible upon receipt, for example, at the base station transceiver where the connection requests area received.

In one embodiment, the communications device or the network applies a time stamp to the network connection request, for example on transmission or receipt, wherein the order of transmission of the connection request is indicated by the time stamp of the network connection requests. In another embodiment, the communications device or the network applies a sequence indicator, for example, a counter, to the connection request, wherein the order of transmission us indicated by the sequence indicator of the network connection requests.

The home location register or other entity is generally some distance form the point in the network where the network connection requests are first received. The home location register or other entity uses the indices, for example, time stamps or counters, or other order indicating indicia, added to the network connection requests from a particular communications device to determine the order in which the network locations requests were sent by the communications device to the network.

While the present disclosure and what are considered presently to be the best modes of the inventions have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a communications device, the method comprising:
   transmitting a first network connection request to a first network;
   waiting for a specified time period to elapse after transmitting the first network connection request,
   transmitting a second network connection request to a second network after waiting the specified time period, the second network connection request transmitted when the communication device is not connected to the first network.

2. The method of claim 1,
   transmitting the first network connection request to an AMPS network,
   transmitting the second network connection request to a CDMA network.

3. The method of claim 1, transmitting the second network connection request to the second network after waiting at least 3 seconds.

4. The method of claim 1,
   detecting the second network after transmitting the first network connection request,
   transmitting the second network connection request after detecting the second network.

5. The method of claim 1, waiting for a specified time period determined by the communication device.

6. The method of claim 1, transmitting the second network connection request to the second network before receiving an acknowledgement in response to sending the first network connection request.

7. A method in a communications device, the method comprising:
   transmitting a first network connection request to a first network;
   transmitting a second network connection request to the first network after a specified time interval occurring after transmitting the first network connection request to the first network.

8. The method of claim 7, receiving a message from a network, the message containing delay information on which the specified time interval is based.

9. The method of claim 8,
   receiving a message from a network, the message containing delay information on which the specified time interval is based
   where the delay information is dependent upon a network to which the communications device was most recently connected before transmitting the first network connection request to the first network.

10. The method of claim 7,
    transmitting a network connection request to a different network before transmitting the first network connection request to the first network,
    transmitting the second network connection request to the first network only if the communications device first transmits the network connection request to the different network within a specified time of the transmission of the first network connection request to the first network.

11. A method in a communications device, the method comprising:
    attempting to connect the communications device to a second network upon losing a connection to a first network;
    transmitting a network communication request from the communications device to the first network if the attempt to connect to the second network fails.

12. The method of claim 11,
    attempting to connect to the second network includes transmitting a network connection request to the second network,
    failing to connect to the second network includes failing to receive a network connection acknowledgement within a specified time period in response to transmitting the network connection request.

* * * * *